United States Patent

Ayers et al.

[15] 3,664,504
[45] May 23, 1972

[54] METHOD AND APPARATUS FOR DEPLOYING A FLOATABLE BARRIER

[72] Inventors: Ray R. Ayers; Paul E. Titus, both of Houston, Tex.; James R. Hanson, Martinez, Calif.

[73] Assignee: Shell Oil Company, New York, N.Y.

[22] Filed: Sept. 9, 1970

[21] Appl. No.: 70,744

[52] U.S. Cl. ..........................210/83, 61/1 F, 210/DIG. 21, 210/242
[51] Int. Cl. ..........................................B01d 21/00
[58] Field of Search..................210/83, 242, DIG. 21; 61/1, 61/34, 69

[56] References Cited

UNITED STATES PATENTS

| | | | |
|---|---|---|---|
| 3,548,605 | 12/1970 | Paull et al. | 61/1 |
| 3,563,036 | 2/1971 | Smith et al. | 61/1 |
| 2,968,928 | 1/1961 | Wicklander | 61/1 |

FOREIGN PATENTS OR APPLICATIONS

| | | | |
|---|---|---|---|
| 1,528,855 | 5/1968 | France | |

Primary Examiner—Reuben Friedman
Assistant Examiner—T. A. Granger
Attorney—Harold L. Denkler and Theodore E. Bieber

[57] ABSTRACT

Method and apparatus for deploying a floatable barrier is disclosed wherein the barrier is initially collapsed in a storage location provided by a container having means allowing escape of the barrier from the storage location upon sinking of the container and means for sinking the container. As the container is sunk, the barrier floats out of the storage location and may be deployed merely by uncollapsing the same.

15 Claims, 3 Drawing Figures

METHOD AND APPARATUS FOR DEPLOYING A FLOATABLE BARRIER

BACKGROUND OF THE INVENTION

Elongate buoyant booms or barriers are conventionally deployed adjacent an oil spill on a water surface to control the areal extent of the spill on a water surface and to facilitate removal of the liquid hydrocarbon. Such booms are commercially available from Neirad Industries under the trade name "Slickbar."

Oil booms are conventionally deployed by carefully depositing the device, section by section from a marine platform or vessel. It is difficult for inexperienced personnel to deploy a boom without detrimental twisting thereof. Inexperienced vessel operators have difficulty in avoiding tangling the boom in the vessel screws, especially in unfavorable environmental conditions such as high waves, strong current, high wind and the like. Conventional deployment is even more difficult in the case of much heavier offshore type booms. Deployment by conventional means from the stern of a vessel requires considerable deck space thereby requiring large vessels which are expensive to purchase or rent. Large vessels capable of conventionally deploying oil booms are unsuited for positioning or moving the boom through the water because of the lack of maneuverability. Consequently a smaller vessel must likewise be obtained to tow or position the boom in the water. Manpower requirements for the successful deployment of a small-to-medium weight boom by conventional means, excluding a vessel operator, vary between three and seven laborers with prior experience in booming. Because of movement of the oil spill, it frequently happens in practice that the boom is deployed in the wrong position. Repositioning the boom merely by towing it to the direct location is sometimes not feasible since presently available booms cannot be towed faster than about one knot.

SUMMARY OF THE INVENTION

It is an object of this invention to provide a method and means for rapidly and expeditiously deploying a floatable barrier capable of controlling the spread of a liquid pollutant floating on a body of water.

Another object of the invention is to provide a method and apparatus for deploying a floatable oil boom by sinking a container having the floatable barrier collapsed therein and allowing the floatable barrier to escape from the sinking container.

A further object of the invention is to provide a method and apparatus of the type mentioned wherein the container is raised to the surface after the barrier escapes therefrom for subsequent reuse or for use in the process for controlling the oil spill.

BRIEF DESCRIPTION OF THE DRAWINGS

FIG. 3 is an isometric view of another container of this invention.

DESCRIPTION OF PREFERRED EMBODIMENTS

Figure 1:
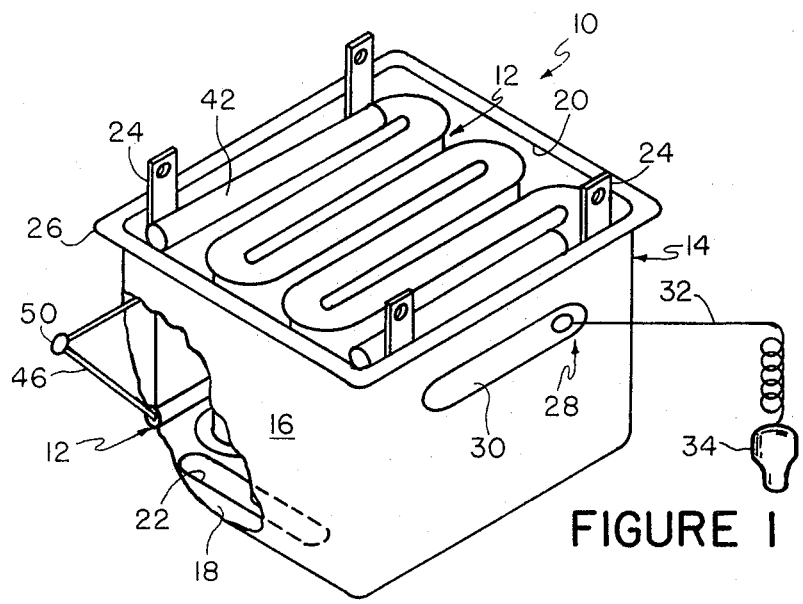
FIG. 1 is an isometric view of one embodiment of the invention illustrating a floatable barrier collapsed in a sinkable container, certain parts being broken away for clarity of illustration.
Figure 2:
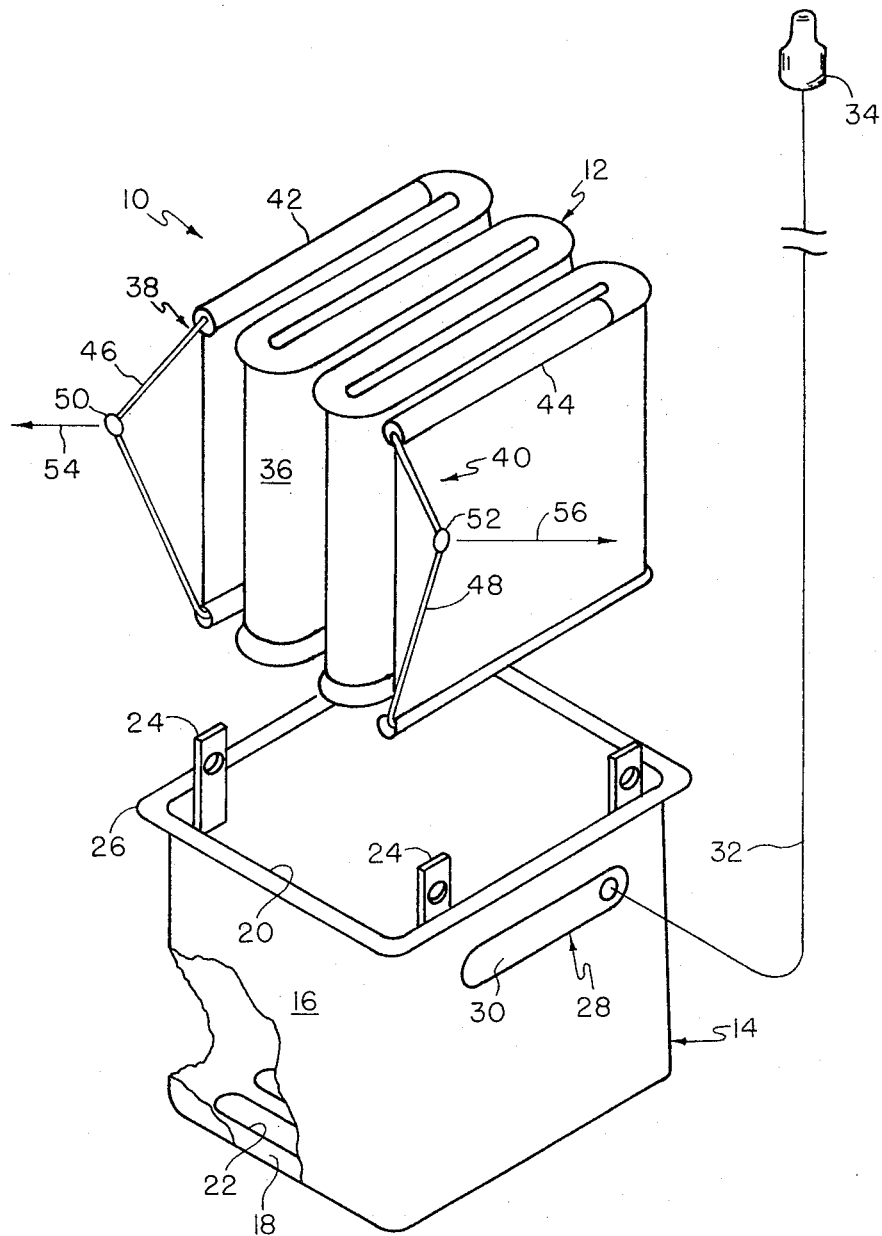
FIG. 2 is an exploded isometric view of the embodiment of FIG. 1 illustrating escape of the collapsed boom from the container upon the sinking thereof.

Attention is directed to FIGS. 1 and 2 wherein there is shown an apparatus 10 for deploying a floatable barrier 12 on a water surface to contain or facilitate removal of a film of liquid pollutant floating thereon. The liquid pollutant normally comprises hydrocarbons although it will be apparent that this invention may be used to control other types of liquid pollutants. A major component of the apparatus 10 is a container 14 having the barrier 12 collapsed therein. As shown best in FIG. 2, the container 14 is sinkable allowing escape of the barrier 12 therefrom which may then be uncollapsed, as by pulling on the ends thereof.

The container 14 comprises a receptacle 16 of any convenient shape, but which is illustrated as generally rectangular. The receptacle 16 includes a barrier receiving compartment 18, means 20 allowing escape of the barrier 12 from the compartment 18 and means 22 for sinking the container 14. In the embodiment illustrated in FIGS. 1 and 2, the escape allowing means 20 merely comprises the open top or side of the receptacle 16. It will be apparent to those skilled in the art that the escape allowing means 20 may be a movable closure or the like for the top or a side of the receptacle 16.

The sinking means 22 is illustrated in FIGS. 1 and 2 as comprising openings in the receptacle 16 below the water line thereof to allow ingress of water thereinto. In the illustrated embodiment, the receptacle 16 should be more dense than water so that it sinks when placed therein. It will be apparent that suitable weights and the like may be attached to the container 16 to ensure sinking thereof.

It is normally desirable to have the container 14 sink when placed in the water. Under some circumstances, however, it is desirable to have the container 14 initially buoyant. For example, it may be desirable to tow the container 14 through the water to the area of an oil spill or it may be desirable to tether the container 14 in a crucial area, as near an unloading pier or near the mouth of a water course carrying affluent water. In these circumstances, the sinking means 22 may comprise an opening below the water line of the container 14, a normally closed closure associated therewith and remotely controlled means for opening the closure. It will be apparent to those skilled in the art that this arrangement may be carried out in any number of ways.

The container 14 also comprises a plurality of lifting lugs 24 of any suitable type to enable the apparatus 10 to be lifted and moved about with conventional equipment. The container 14 also preferably comprises a lip 26 around the open top thereof providing strength for the receptacle 16 and for purposes more fully explained hereinafter.

After the container 14 has been sunk to allow escape of the barrier 12, it may be abandoned if desired. It is, however, preferred to raise the container 14 for subsequent reuse and/or for use in the spill controlling operation. The simplest recovery means is a buoy and line connected to the container whereby the container may be located and hoisted aboard a vessel. It is preferred, however, to buoyantly raise the container 14 to the water surface. To this end, there is provided a buoyant recovery means 28 comprising an inflatable member 30 secured to opposite sides of the receptacle 16 adjacent the lip 26. It will be seen that the lip 26 provides substantial protection for the inflatable member 30 to prevent puncture thereof when in the collapsed condition.

Inflation of the member 30 is preferably acomplished by the use of a pressurized gas cartridge actuated in any convenient manner. For example, means may be provided responsive to water pressure to pierce the cartridge when the container 14 sinks below a predetermined depth, e.g., 10 feet. In the alternative, the buoyant recovery means 28 may comprise a force actuable plunger for piercing the cartridge in response to a predetermined force existing in the line 32 connecting the force actuating mechanism to a buoy 34. When the container 14 sinks sufficiently to tension the line 32, tension in the line 32 may release a spring actuated plunger to pierce the cartridge.

The boom or barrier 12 may be of any type capable of being collapsed for storage in the compartment 18. Preferably, the barrier 12 is folded in accordion fashion as shown in FIGS. 1 and 2. The barrier 12 may include a plurality of solid buoyant floats or may comprise an inflatable boom of the type shown generally in U.S. Pat. 3,494,132. In any event, the barrier 12 comprises a foldable float section 36 and means 38, 40 on the ends of the float section 36 for uncollapsing or unfolding the section 36. Each of the uncollapsing means 38, 40 comprises a stiffening section 42, 44 secured to the float section 36 and about one full fold length long and a bridle 46, 48 having a connection 50, 52 thereon. The connections 50, 52 may comprise an eye for attachment by a hook to a towing vessel.

The apparatus 10 may be placed in the spill area by throwing the device overboard from a vessel or by dropping it from an aircraft or helicopter. As water flows through the openings 22, the receptacle 16 fills with water causing the container 14 to sink. If the barrier 12 is of the type comprising solid floats, it substantially immediately begins to escape through the open top of the receptacle 16. If the barrier 12 is of the inflatable type, suitable means may be provided to partially inflate the same to ensure removal from the container 14 rather than wedging therein. Complete inflation may await escape of an inflatable barrier from the container 14. The connections 50, 52 are then attached to separate vessels to impart uncollapsing or unfolding forces to the barrier 12 as represented by the force vectors 54, 56. In the alternative, the connections 50, 52 may be attached to a pair of lines leading from opposite sides of a single vessel in the barrier 12 towed slowly through the water to unfold the same rearwardly into a draped or arcuate configuration. The barrier 12 may then be used in a conventional manner to contain the areal extent of the pollutant spill or may be used to facilitate removal thereof.

Recovery of the container 14 is effected by inflation of the members 30 which are designed to impart a buoyant force to the receptacle 16 sufficient to float the container 14. The container 14 may then be removed from the water by securing a line to one or more of the lifting lugs 24 and hauling the container 14 aboard the vessel.

Referring now to FIG. 3, there is shown another container 60 made in accordance with the principles of this invention. The container 60 comprises a receptacle 62 having therein a barrier receiving compartment 64, means 66 allowing escape of a barrier from the compartment 64 and means 68 for sinking the container 60. As in the embodiment of FIGS. 1 and 2, the escape allowing means 66 comprises the open top or side of the receptacle 62 and the sinking means comprises apertures 68 in the receptacle 62 below the water line thereof. The receptacle 62 also comprises a lip 70 around the periphery thereof and a plurality of lifting lugs 72.

The container 60 also comprises buoyant recovery means 74 for floating the container 60 after the floating barrier has escaped from the compartment 64. Although the buoyant recovery means may be constructed by making the receptacle 62 buoyant and releasing weights therefrom, the buoyant recovery means 74 is preferably an inflatable member 76 secured to the receptacle 62 on opposite sides thereof as in the embodiment of FIGS. 1 and 2. Similarly, the buoyant recovery means 74 is illustrated as comprising a flexible line 78 attached to a buoy 80. The buoyant recovery means 74 preferably operates by tension on the line 78 releasing a spring biased plunger to pierce a pressurized cartridge to inflate the member 76.

The major differences between the container 60 and the embodiment of FIGS. 1 and 2 resides in the provision of a skimming mechanism 82 and a wave baffle 84. The skimming mechanism 82 comprises a weir 86 defined by the forward end of the lip 70. The lip 70 comprises downwardly inclined symmetrical sections 88, 90 to present a downwardly and forwardly inclined surface 92. The inflatable members 76 and the weir 86 are designed such that when the members 76 are inflated, the weir 86 is slightly below the water surface. Consequently, the weir 86 acts to allow the floating pollutant liquid to pass thereover into the compartment 64. Suitable means, such as an apertured lug 94 may be provided for purposes more fully explained hereinafter. The wave baffle 84 comprises a plate 96 extending through the height of the receptacle 62 and having a plurality of apertures 98 therein.

The lug 94 is provided so that a pair of barriers 12 may be secured thereto and extended away from the container 60 in a generally V or U configuration in much the same manner that the booms of U.S. Pat. 3,219,190 are deployed. As the container 60 and its associated barriers are moved relative to the water, the film of liquid pollutant and some water passes over the weir 86 and through the apertures 98 into the compartment 64. It will be apparent that the liquids in the compartment 64 are relatively quiescent enhancing gravitational segregation of the oil and water. Suitable means such as pumps and the like (not shown) may be used to remove the pollutant accumulating in the upper part of the compartment 64. Water may, of course, pass downwardly through the apertures 68. It will accordingly be seen that the container 60 comprises means for separating the floating liquid pollutant from the associated water.

I claim as my invention:

1. Apparatus for deploying an elongate boom on the surface of a body of water comprising:

A floating container having a boom receiving compartment, a collapsed floatable boom in the compartment, the boom being capable in the uncollapsed state of controlling the spread of a liquid pollutant floating on the surface of said body of water, means allowing complete escape of the boom from the compartment upon sinking thereof of said container below the surface of said body of water, and means for sinking said container. The foregoing to improve clarity.

2. The apparatus of claim 1 wherein the means for sinking the container comprises apertures in the bottom of the apparatus for allowing water entrance into the container.

3. The apparatus of claim 1 wherein the container has sides, one of the sides being an open side comprising the escape allowing means.

4. The apparatus of claim 1 wherein the boom is accordion folded in the compartment.

5. The apparatus of claim 1 further comprising means for floating the container after sinking thereof.

6. The apparatus of claim 1 comprising means for buoyantly raising the container to the surface and for buoyantly retaining the container thereat.

7. The apparatus of claim 6 wherein the container comprises means for skimming a liquid pollutant from the water surface and for passing the liquid pollutant into the compartment when the boom is outside the compartment.

8. The apparatus of claim 7 wherein the container comprises means between the skimming means and the compartment for baffling wave movement.

9. The apparatus of claim 7 wherein the container comprises means for separating the liquid pollutant from the water.

10. The apparatus of claim 9 wherein the sinking means and the separating means comprises apertures in the container below the water line thereof for allowing water entrance thereinto and water exit therefrom.

11. The method for deploying a floatable boom from a floating container on the surface of a liquid body comprising sinking the container having the floatable boom collapsed therein and allowing the floatable boom to completely escape from the sinking container; and then uncollapsing the floatable boom, whereby the boom is capable of controlling the spread of a liquid pollutant floating on the liquid body.

12. The method of claim 11 wherein the collapsed boom is folded while in the container and the uncollapsing step comprises pulling on the ends of the boom.

13. The method of claim 11 further comprising the step of raising the container to the surface after the boom escapes therefrom.

14. The method of claim 13 wherein the raising step comprises buoyantly raising the container.

15. The method of claim 13 wherein the container comprises means for skimming a liquid pollutant from the surface of the liquid body, the method comprising sinking a plurality of containers, allowing a plurality of floatable booms to escape therefrom, uncollapsing the plurality of booms and connecting the plurality of booms to the container comprising the skimming means for directing a liquid pollutant into the container.

* * * * *